US011235359B2

(12) United States Patent
Bolton et al.

(10) Patent No.: US 11,235,359 B2
(45) Date of Patent: Feb. 1, 2022

(54) ROBOTIC LASER AND VACUUM CLEANING FOR ENVIRONMENTAL GAINS

(71) Applicant: The Boeing Company, Chicago, IL (US)

(72) Inventors: Joseph Andrew Bolton, Newalla, OK (US); Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 16/272,561

(22) Filed: Feb. 11, 2019

(65) Prior Publication Data
US 2020/0254494 A1    Aug. 13, 2020

(51) Int. Cl.
*B08B 7/00* (2006.01)
*B23K 26/361* (2014.01)
*A47L 7/00* (2006.01)
*B23K 26/40* (2014.01)
*B23K 101/34* (2006.01)

(52) U.S. Cl.
CPC .......... *B08B 7/0042* (2013.01); *A47L 7/0076* (2013.01); *B23K 26/361* (2015.10); *B23K 26/40* (2013.01); *A47L 2201/06* (2013.01); *B23K 2101/35* (2018.08)

(58) Field of Classification Search
CPC .... B08B 7/0042; B23K 26/361; B23K 26/40; B23K 2101/35; A47L 7/0076; A47L 2201/06
USPC .......................................... 219/121.6, 121.69
See application file for complete search history.

(56) References Cited

U.S. PATENT DOCUMENTS

| 3,835,498 | A | | 9/1974 | Arato | |
|---|---|---|---|---|---|
| 4,588,885 | A | * | 5/1986 | Lovoi | B08B 7/0042 134/1 |
| 4,850,093 | A | * | 7/1989 | Parente | B21D 47/00 29/428 |
| 4,900,891 | A | * | 2/1990 | Vega | B08B 7/0042 219/121.6 |

(Continued)

FOREIGN PATENT DOCUMENTS

| CN | 205659939 U | * 10/2016 |
|---|---|---|
| CN | 205659939 U |   10/2016 |

(Continued)

OTHER PUBLICATIONS

Uchtmann, H et al., "Laser micro drilling of wing surfaces for hybrid laminar flow control", Lasers in Manufacturing Conference, Jan. 1, 2017, obtained from internet: https://ntrs.nasa.gov/archive/nasa/casi.ntrs.nasa.gov/19990052585.pdf.

(Continued)

*Primary Examiner* — Jimmy Chou
(74) *Attorney, Agent, or Firm* — Coats & Bennett, PLLC

(57) ABSTRACT

Methods, systems, and apparatuses are disclosed for the selective and controlled removal of debris from specific areas of a substrate outer surface without adversely impacting the substrate outer surface, including substrate outer surface coatings, and returning an actual substrate outer surface profile containing affixed debris to a predetermined substrate outer surface profile by comparing a library of predetermined profiles to an actual substrate outer surface profile in real time.

18 Claims, 10 Drawing Sheets

(56) References Cited

U.S. PATENT DOCUMENTS

| | | | | |
|---|---|---|---|---|
| RE33,777 E | * | 12/1991 | Woodroffe | B23K 26/40 134/1 |
| 5,120,395 A | * | 6/1992 | Monson | F16C 33/6677 216/65 |
| 5,204,517 A | * | 4/1993 | Cates | B44D 3/166 134/1 |
| 5,281,798 A | * | 1/1994 | Hamm | B08B 7/0035 250/205 |
| 5,328,517 A | * | 7/1994 | Cates | B08B 7/0035 134/1 |
| 5,438,441 A | * | 8/1995 | Rockstroh | G02B 5/32 359/15 |
| 5,482,561 A | * | 1/1996 | Yeung | B08B 7/0042 134/1 |
| 5,613,509 A | * | 3/1997 | Kolb | B24C 1/003 134/1 |
| 5,643,476 A | * | 7/1997 | Garmire | B08B 7/0042 219/121.68 |
| 5,662,762 A | * | 9/1997 | Ranalli | B08B 7/0042 156/707 |
| 5,782,253 A | * | 7/1998 | Cates | B08B 7/0035 134/105 |
| 5,789,755 A | * | 8/1998 | Bender | B08B 7/0042 134/1 |
| 5,864,114 A | * | 1/1999 | Fukuda | B08B 7/0042 219/121.83 |
| 5,986,234 A | * | 11/1999 | Matthews | B08B 7/0042 219/121.68 |
| 6,172,331 B1 | * | 1/2001 | Chen | B23K 26/032 219/121.71 |
| 6,251,328 B1 | * | 6/2001 | Beyer | B21D 5/00 264/400 |
| 7,525,065 B2 | | 4/2009 | Engler et al. | |
| 7,633,033 B2 | * | 12/2009 | Thomas | B23K 26/03 219/121.62 |
| 7,800,014 B2 | * | 9/2010 | Thomas | B23K 26/0652 219/121.62 |
| 10,112,257 B1 | * | 10/2018 | Thomas | B23K 26/032 |
| 2003/0052101 A1 | * | 3/2003 | Gu | B08B 7/0042 219/121.71 |
| 2003/0189178 A1 | * | 10/2003 | Wagoner | B64F 5/30 250/459.1 |
| 2004/0074883 A1 | * | 4/2004 | Kilburn | F01D 25/002 219/121.69 |
| 2006/0000813 A1 | * | 1/2006 | Engler | B23K 26/40 219/121.69 |
| 2006/0066579 A1 | * | 3/2006 | Bladt | B23K 26/40 345/173 |
| 2006/0138104 A1 | * | 6/2006 | DeVore | B23K 26/14 219/121.69 |
| 2008/0160295 A1 | * | 7/2008 | Lappalainen | B23K 26/0665 428/332 |
| 2009/0007933 A1 | * | 1/2009 | Thomas | B23K 26/354 134/1 |
| 2009/0210103 A1 | * | 8/2009 | Cook | B64C 23/005 701/3 |
| 2011/0132882 A1 | * | 6/2011 | Dorn | B23K 26/40 219/121.71 |
| 2013/0075374 A1 | * | 3/2013 | Mitsugi | B23K 26/361 219/121.61 |
| 2013/0153555 A1 | * | 6/2013 | Kiliani | B23K 26/40 219/121.71 |
| 2014/0076864 A1 | * | 3/2014 | Kell | B23K 35/0244 219/121.64 |
| 2014/0265042 A1 | * | 9/2014 | Casale | B23K 26/362 264/446 |
| 2014/0305907 A1 | * | 10/2014 | Sprentall | B23K 26/362 219/69.1 |
| 2015/0218746 A1 | * | 8/2015 | Clowes | D06F 75/14 8/137 |
| 2015/0225891 A1 | * | 8/2015 | Clowes | C11D 11/007 8/137 |
| 2016/0158811 A1 | * | 6/2016 | Petersen | B08B 7/0057 134/1 |
| 2016/0263629 A1 | * | 9/2016 | Hagedorn | B23K 26/0884 |
| 2018/0104726 A1 | * | 4/2018 | Tracey | B29C 33/3835 |
| 2018/0185891 A1 | * | 7/2018 | Barclay | B08B 7/0042 |
| 2018/0257790 A1 | * | 9/2018 | Rahamat | B26F 1/02 |
| 2019/0030646 A1 | * | 1/2019 | Kluge | B23K 26/361 |
| 2019/0275565 A1 | * | 9/2019 | Yang | H01J 37/32 |
| 2020/0254494 A1 | * | 8/2020 | Bolton | B64F 5/60 |
| 2021/0008668 A1 | * | 1/2021 | Goya | B23K 26/382 |

FOREIGN PATENT DOCUMENTS

| | | | |
|---|---|---|---|
| CN | 207450289 U | * | 6/2018 |
| GN | 207450289 U | | 6/2018 |
| JP | H10309899 A | | 11/1998 |
| JP | 2014079664 A | | 5/2014 |

OTHER PUBLICATIONS

Beck, N. et al., "Drag Reduction by Laminar Flow Control", journal article, Energies 2018, vol. 11, issue 1, Jan. 1, 2018, pp. 1-28, obtained from internet: https://doi.org/10.3390/en11010252.

* cited by examiner

ROBOTIC LASER AND VACUUM CLEANING FOR ENVIRONMENTAL GAINS

TECHNOLOGICAL FIELD

The present disclosure relates generally to the field of restoring surface profiles to an original profile. More specifically, the present disclosure relates to restoring performance of a substrate surface by restoring performance of a substrate surface profile including the removal of debris from substrate surface.

BACKGROUND

Certain substrate surfaces are established to provide a substrate surface having a designed profile capable of delivering a predetermined characteristic to the substrate surface; such as laminar flow of another material over the substrate surface. Laminar flow is important to substrate surfaces in terms of reducing amounts of drag on a substrate surface, and otherwise establishing the efficiency with which substances can contact and pass over or around substrate surfaces. Substances such as, for example, air found in airflow can adversely impact the efficiency of large objects designed to move through air. For example, when a large object such as, for example, an aircraft comprises an outer surface having a significantly large outer surface area, any variation from an original (e.g., new or "as manufactured") or "clean" outer substrate surface profile to a "dirty" outer substrate surface profile can result in a decrease in aircraft performance, and/or maneuverability, and can also impact factors such as, for example, aircraft fuel efficiency.

Deviation in an original profile of an aircraft substrate surface can result from factors during use including, for example, damage from object impact during flight as well as the build-up of even small amounts of atmospheric debris (e.g., dust, dirt, etc.,) that can build up on an outer substrate surface. In addition, Hybrid Laminar Flow Control (HLFC) technology has been employed to improve fuel efficiency by advantageously altering or improving laminar flow surfaces of aircraft. HLFC surfaces such as, for example, areas at the front (e.g., leading edge areas, etc.) of aircraft wings, can include surfaces perforated by a large number (e.g., up to and including millions, etc.) of micro perforations or "holes" that have micron level diameters. A predetermined portion of airflow over such surfaces passes through the perforations such that the airflow over the surfaces (e.g., wing surfaces, etc.) can be controlled to be laminar instead of turbulent. Such micro holes can fill up with debris or otherwise clog over time while in service. Such perforations can also beneficially take advantage of hot air (e.g., from engine operation, etc.) that is blown through such perforations before take-off, during take-off, and during landing, potentially reducing the need in cold-weather for manual anti-icing operations.

Aircraft outer substrate surfaces, including HLFC surfaces that can include perforations are often cleaned or otherwise serviced at random or regular intervals in the hopes of improving aircraft efficiency. Such cleaning methods include applying vast amounts of liquids, including water, solvents, and water mixed with amounts of solvent(s). Such methods are time-consuming and inefficient; creating, for example, vast amounts of wastewater and other waste product.

In addition, traditional cleaning methods further cannot reliably remove all debris from substrate surfaces, especially surfaces that contain relatively small recesses, including HLFC surfaces that can include perforations. That is, while an aircraft outer substrate surface may appear "clean" after being subjected to a cleaning protocol that is designed to achieve a cleaner laminar surface, such aircraft outer surfaces may retain amounts of adhered debris that may or may not be visible to the eye, and that can still adversely impact an ideal laminar airflow at an outer substrate surface of, for example, aircraft.

SUMMARY

According to a present aspect, a system for removing debris from a substrate outer surface including without adversely affecting the substrate outer surface is disclosed, with the system including a detector for evaluating characteristics of an actual substrate outer surface of a an substrate at a specified location on the actual substrate outer surface, a memory comprising characteristics of a predetermined substrate outer surface, a processor for accessing characteristics of a predetermined substrate outer surface of a predetermined substrate from said memory, with the detector in communication with the processor, and with the processor configured to compare characteristics of the actual substrate outer surface with the characteristics of the predetermined substrate outer surface. The system further includes at least one controller, with the controller in communication with the processor and the memory. A positioning mechanism is in communication with the controller, and an energy source is in communication with the controller. The system further includes a vacuum in communication with the controller, wherein the system non-destructively removes debris from the actual substrate outer surface.

According to another aspect, a method is disclosed, with the method including determining the presence of an amount of debris on a substrate outer surface at a specific substrate outer surface location, determining an amount of energy required to dislodge the debris from the substrate outer surface at the specific substrate surface location, activating an energy source, directing the amount of energy from the energy source to the debris at the specific substrate outer surface location, and dislodging the debris from the substrate outer surface at the specific substrate outer surface location to form an amount of dislodged debris In another aspect, a method is disclosed further including accessing a predetermined substrate outer surface profile, reading an actual substrate outer surface profile of the specific substrate outer surface location, and comparing the predetermined substrate outer surface profile of the specific substrate outer surface location to the actual substrate outer surface profile of the specific substrate outer surface location.

In another aspect, a method further includes removing dislodged debris from the substrate outer surface.

In a further aspect, a method further includes vacuuming the dislodged debris from the substrate outer surface.

In another aspect, a method further includes treating the actual substrate outer surface profile to return the actual substrate outer surface profile to closely approximate the predetermined substrate outer surface profile.

In another aspect, the present application discloses a method of removing debris from a substrate outer surface coating, including effecting such removal without adversely affecting the substrate outer surface coating, with the method including accessing a predetermined substrate outer surface profile from a substrate outer surface profile storage; reading an actual substrate outer surface profile of a specific substrate outer surface location; comparing the predetermined substrate outer surface profile of the specific substrate outer surface location to the actual substrate outer surface profile of the specific substrate outer surface location; determining the presence of an amount of debris on a substrate outer surface coating at a specific substrate outer surface location, with the substrate outer surface coating comprising an outer surface coating thickness; determining an amount of energy required to remove the debris from the substrate outer coating surface at the specific substrate outer surface location; activating an energy source; directing the amount of energy from the energy source to the debris at the specific substrate outer surface location; dislodging the debris from the substrate outer surface coating at the specific substrate outer surface location to form an amount of dislodged debris; and removing the particulate debris from the substrate outer surface coating.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
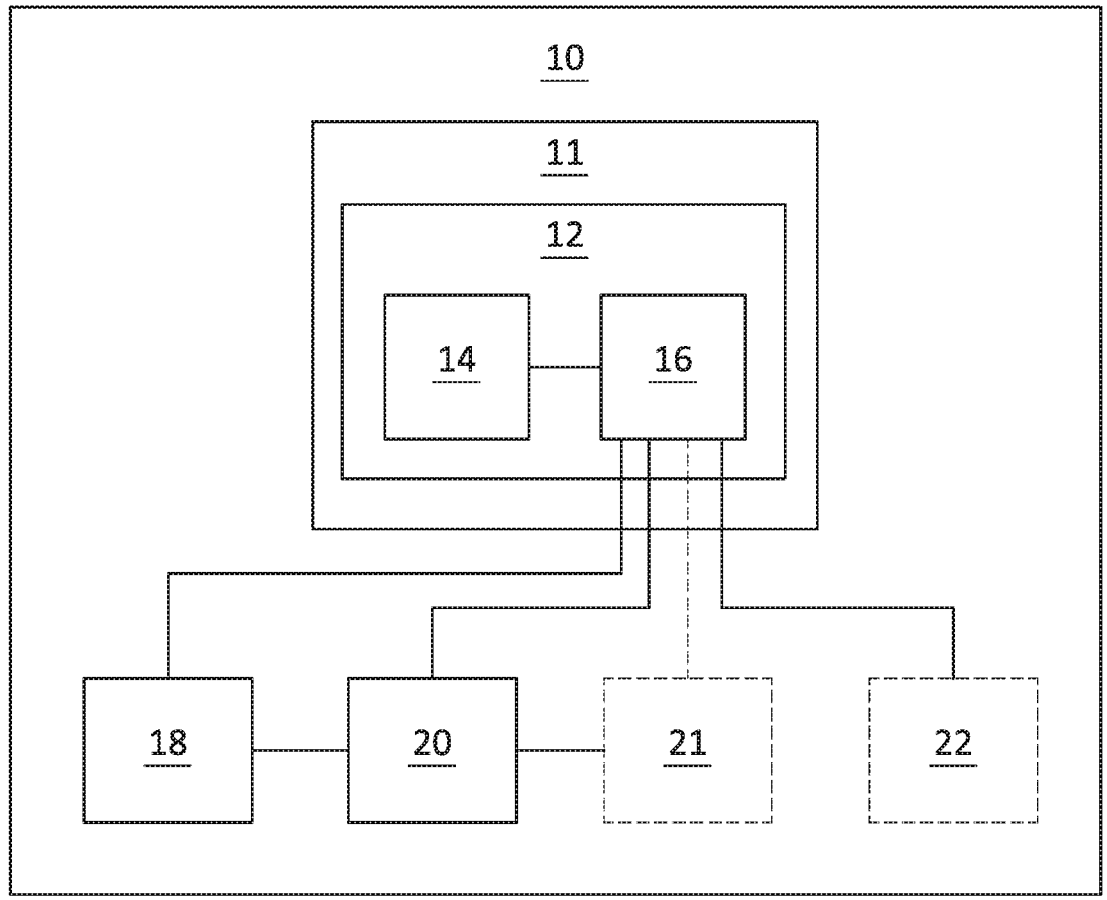
Figure 2:
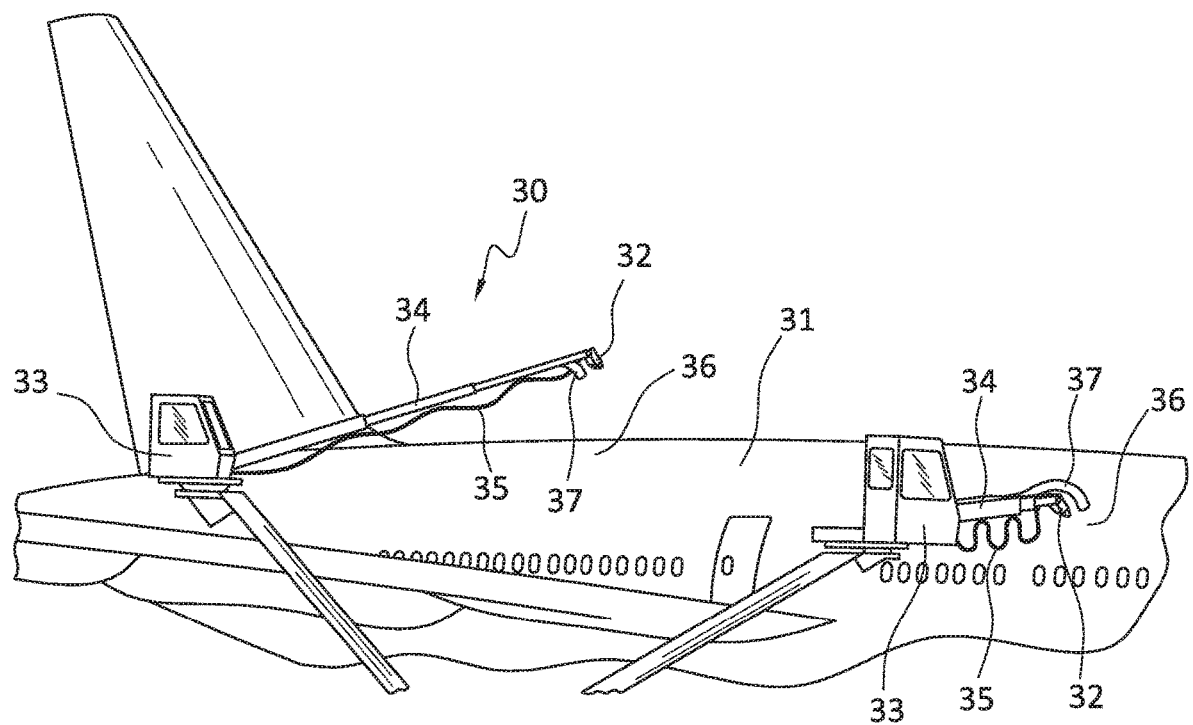
Figure 3:
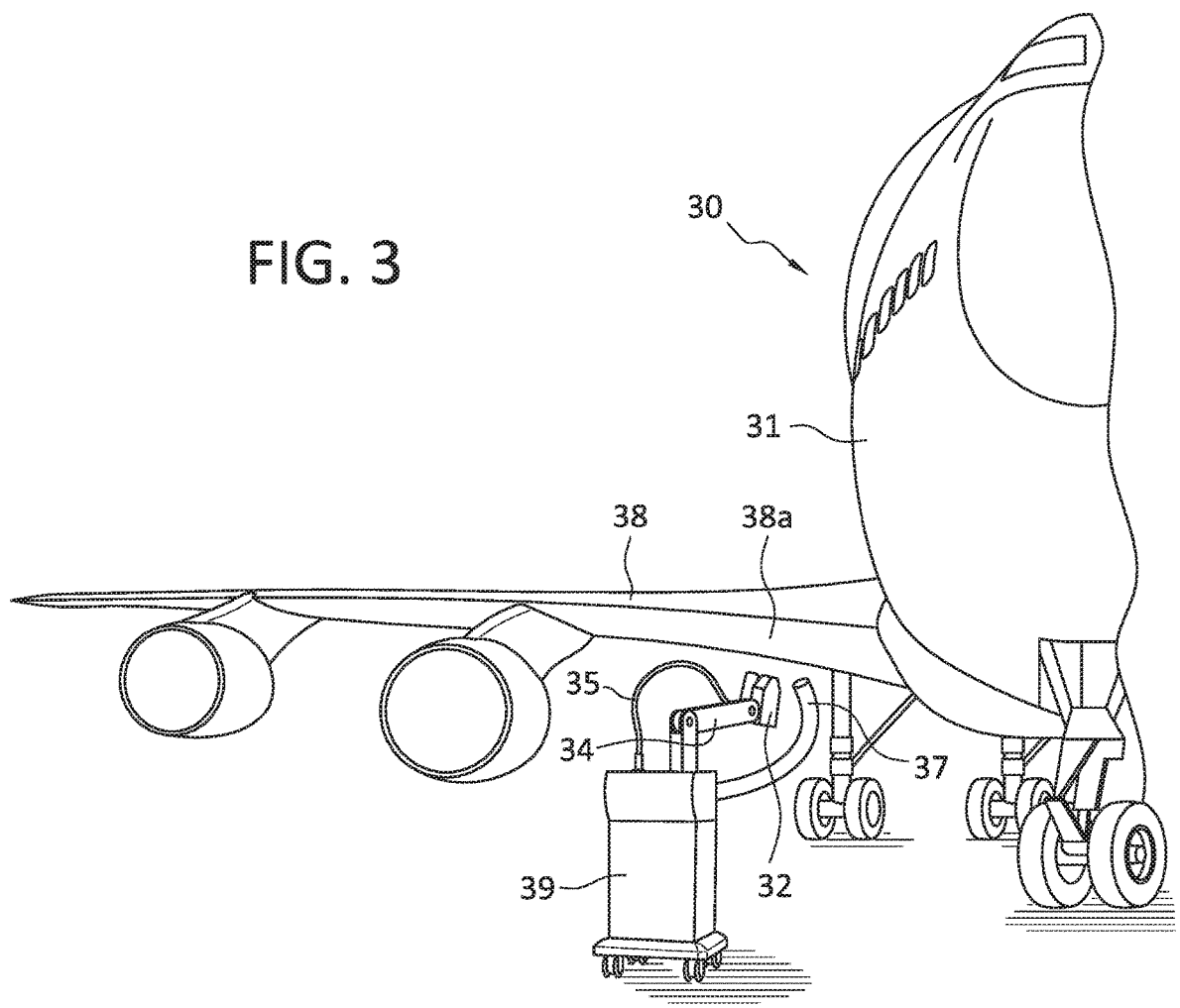
Figure 4:
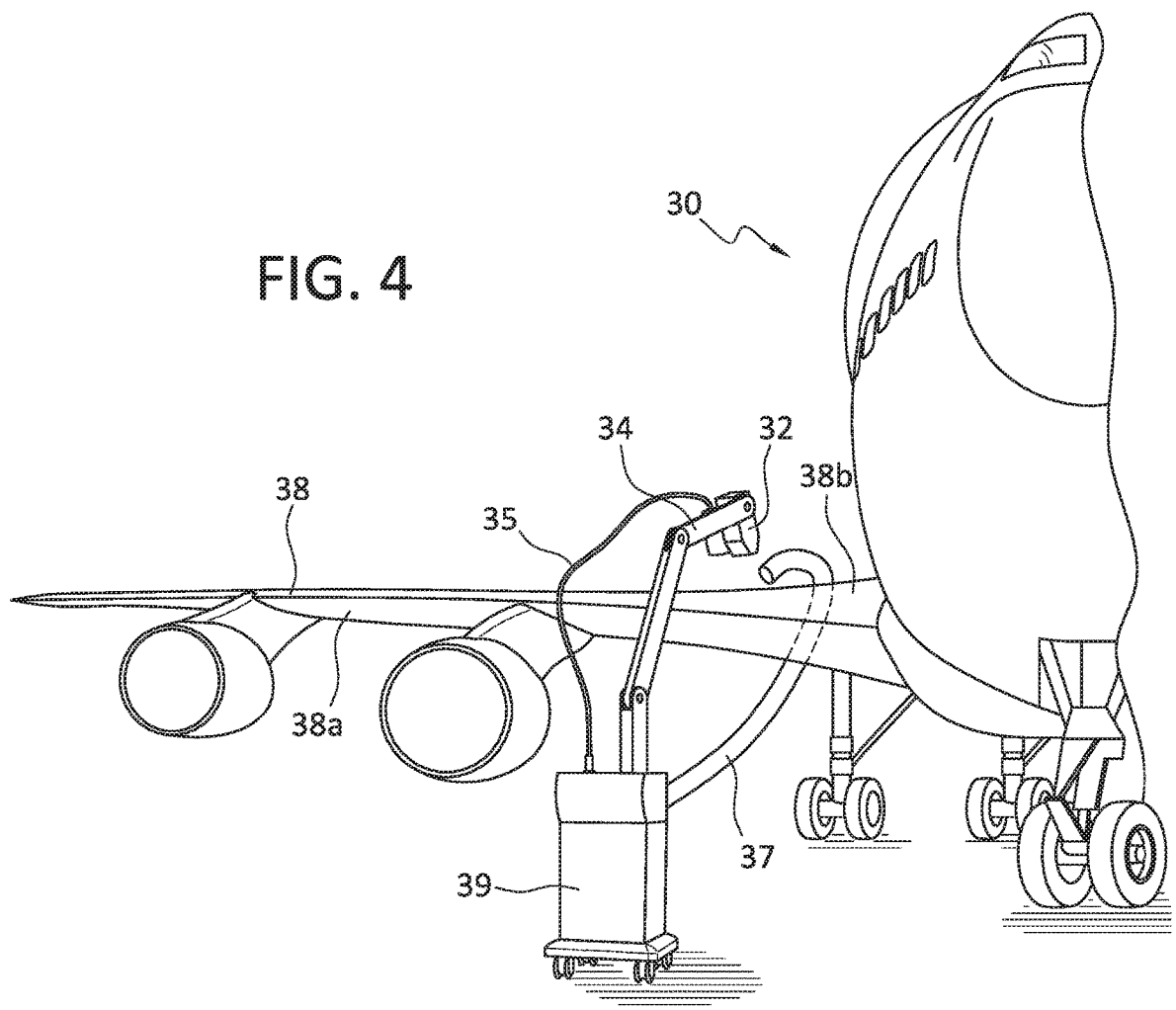
Figure 5A:
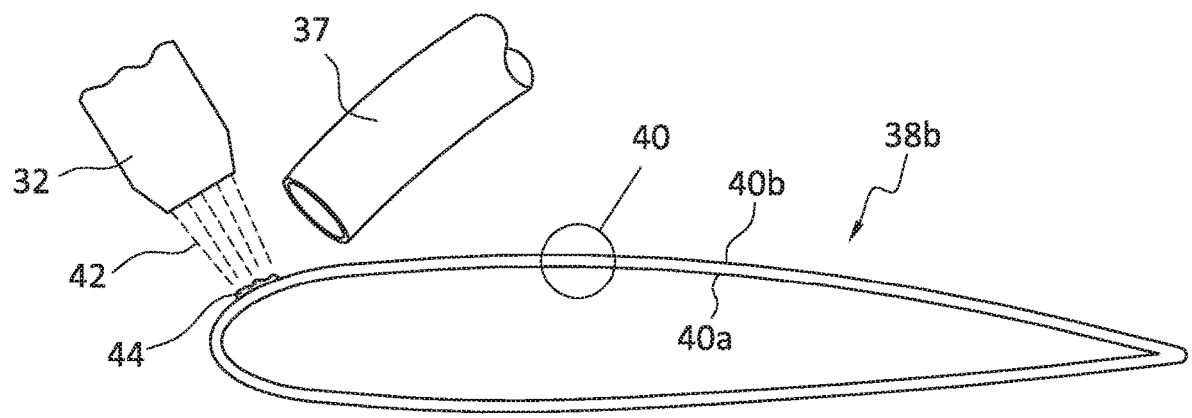
Figure 5B:
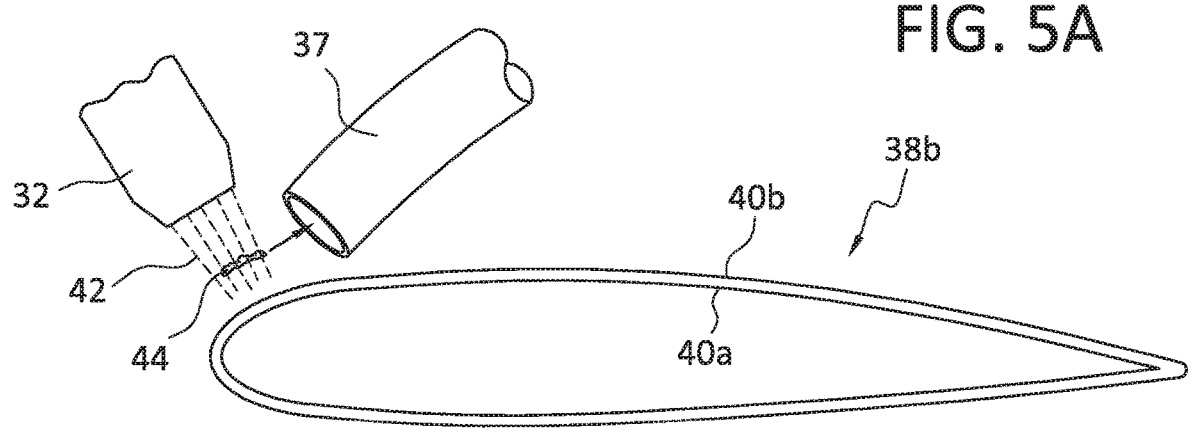
Figure 5C:
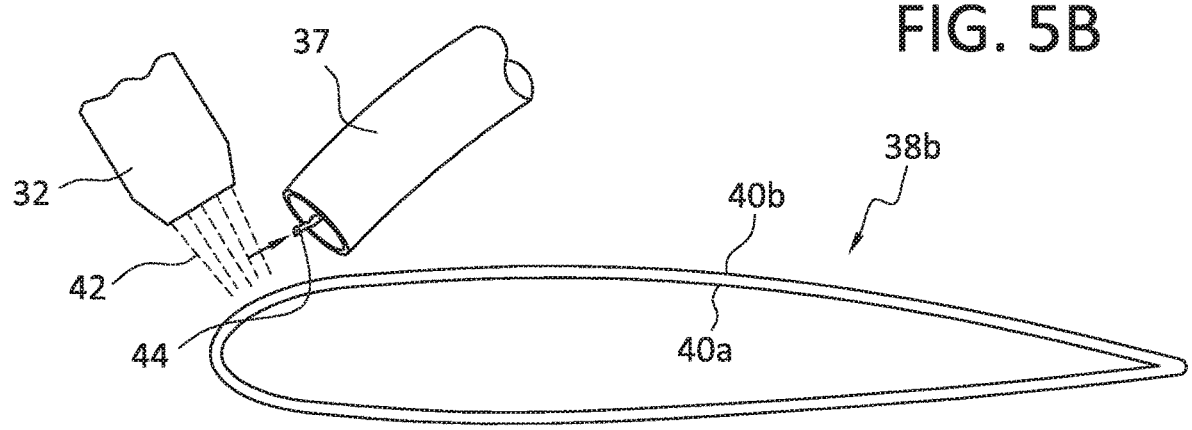
Figure 5D:
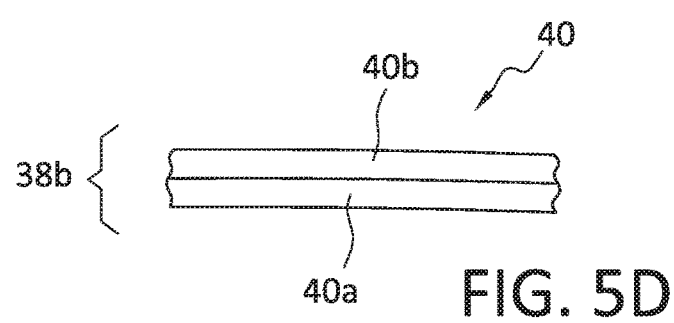
Figure 6A:
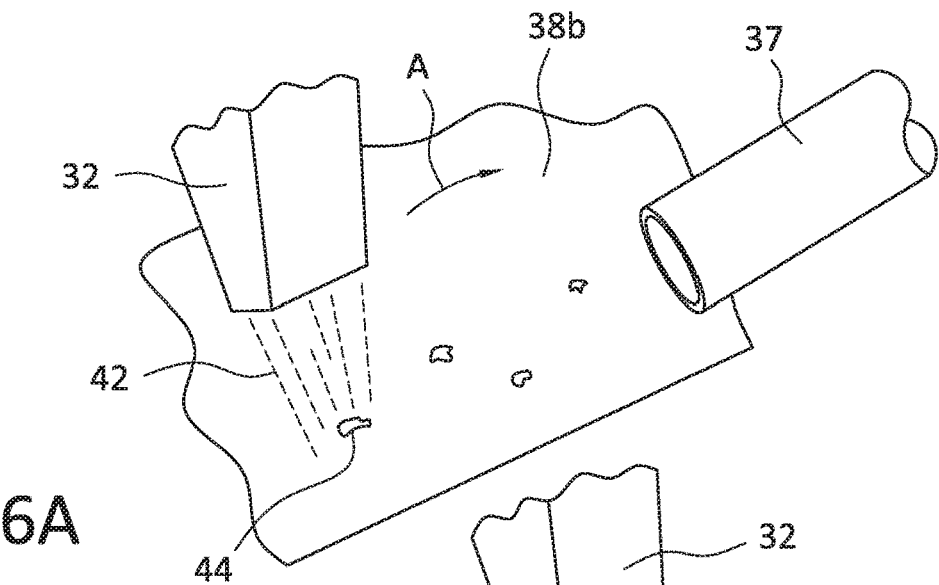
Figure 6B:
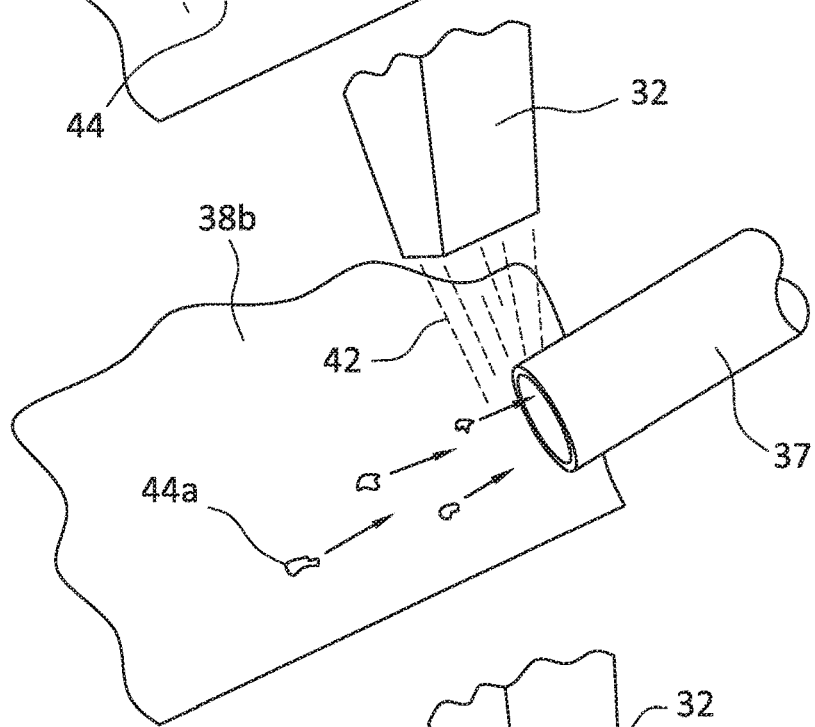
Figure 6C:
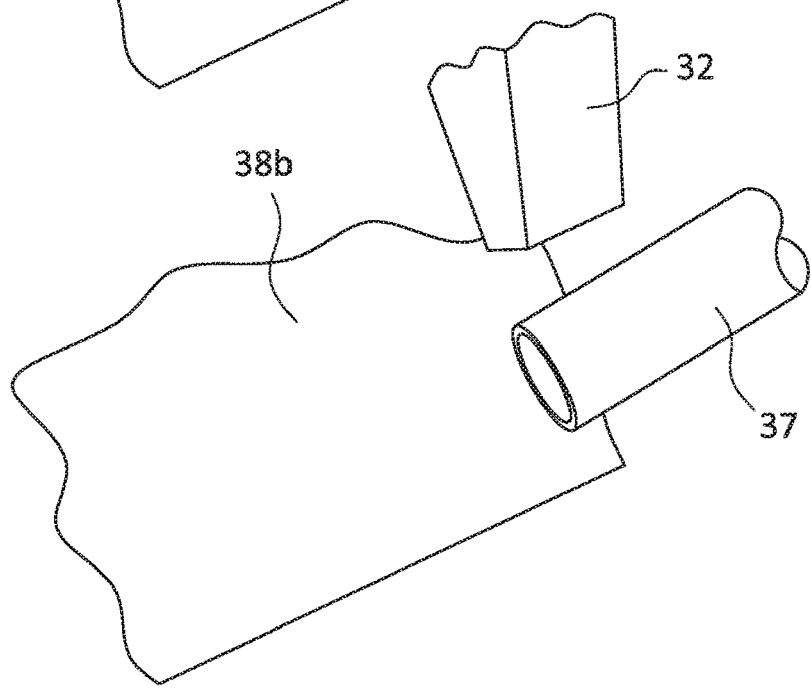
Figure 6D:
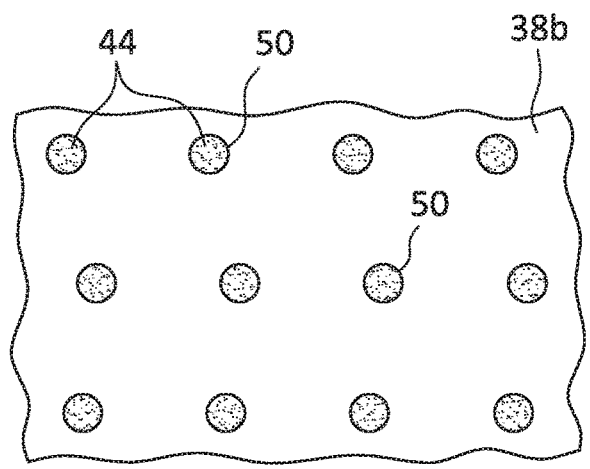
Figure 6E:
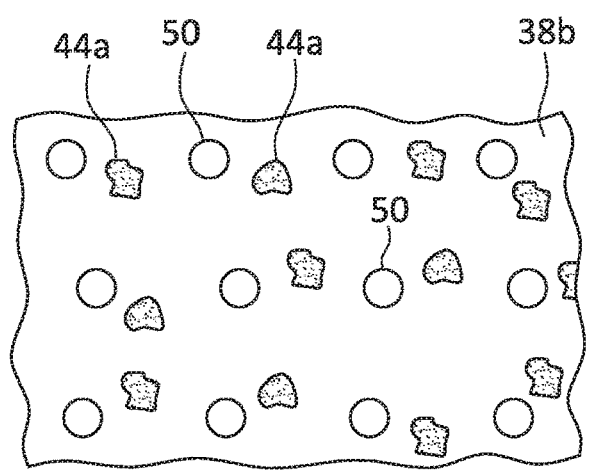
Figure 6F:
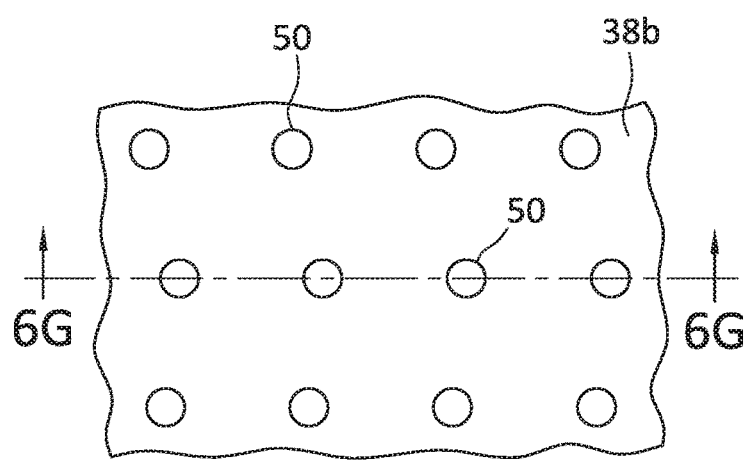
Figure 6G:
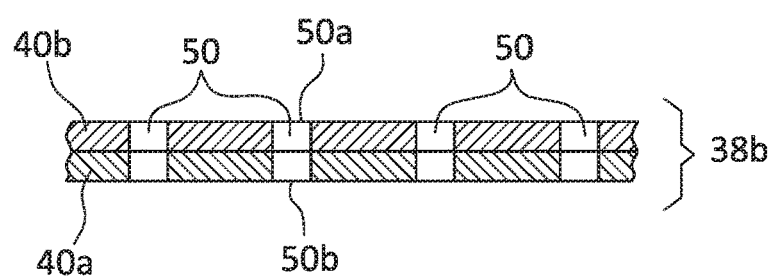
Figure 7:
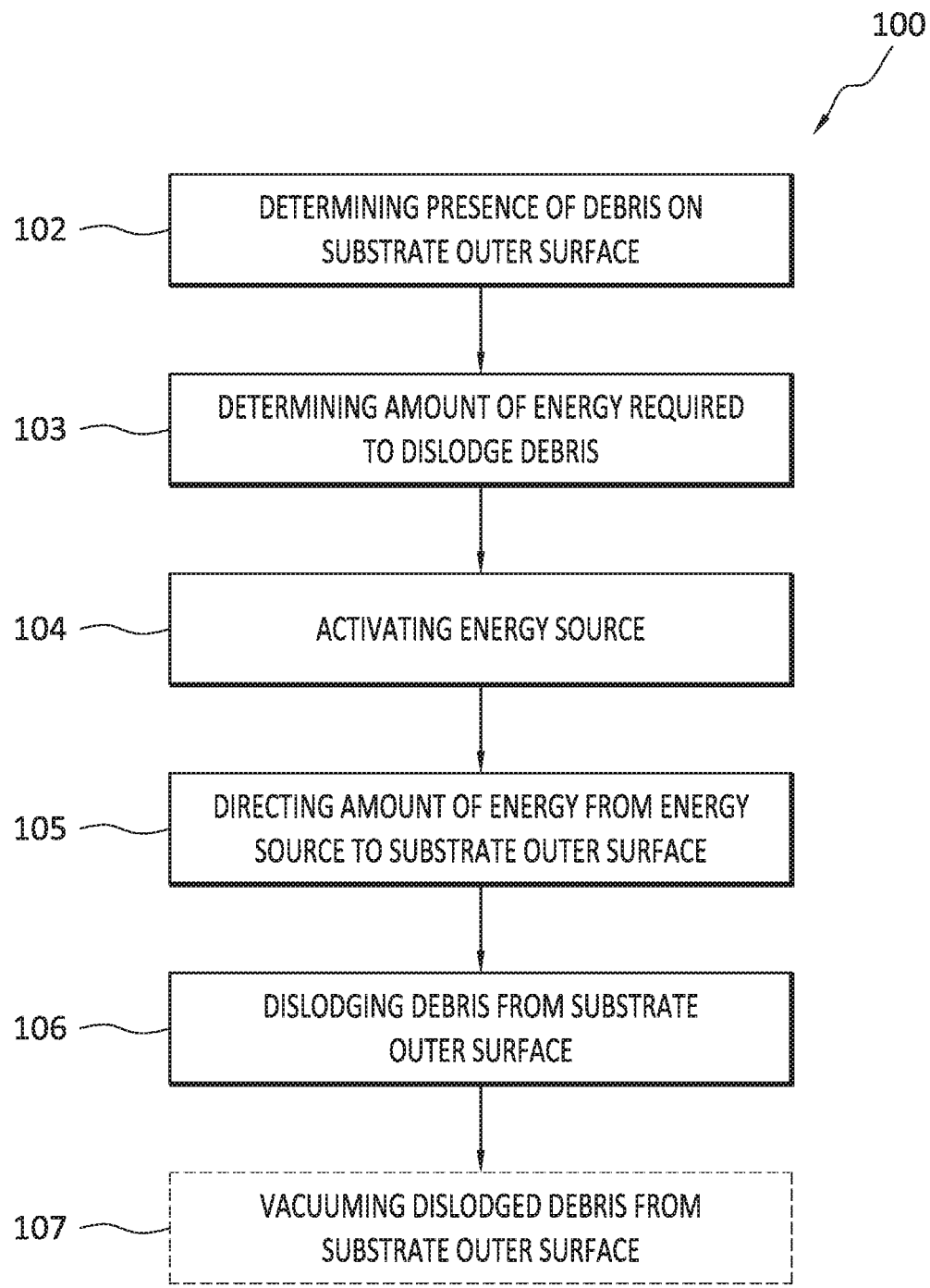
Figure 8:
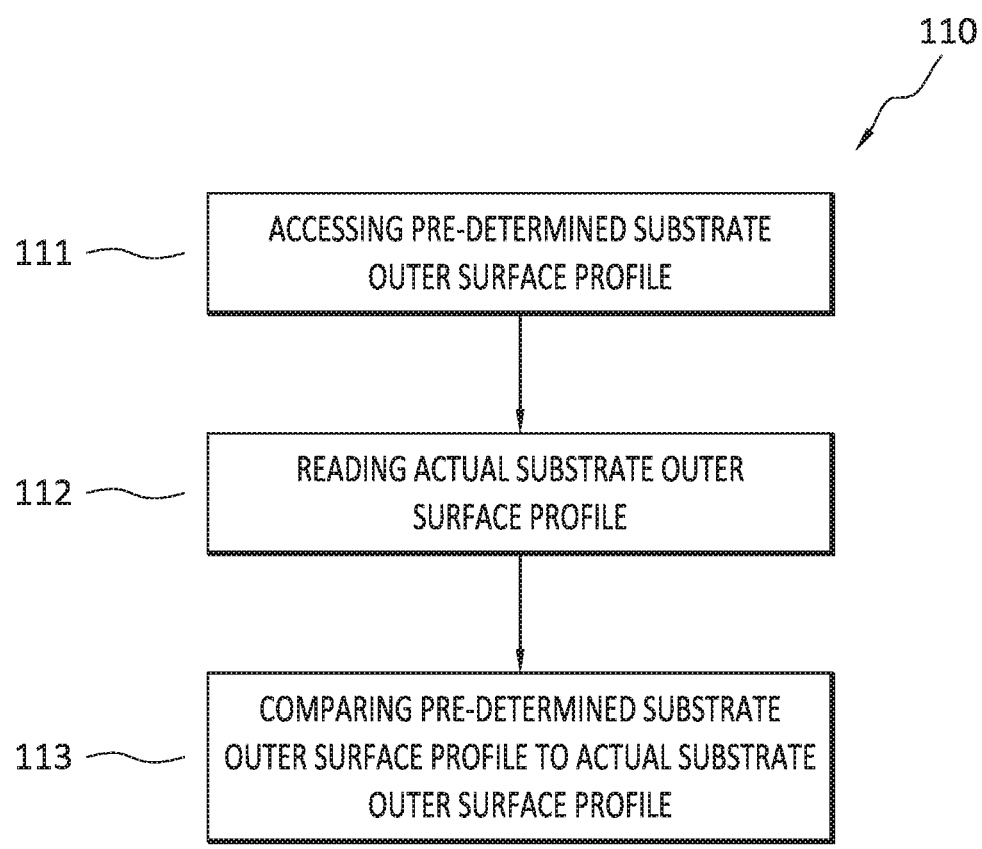
Figure 9:
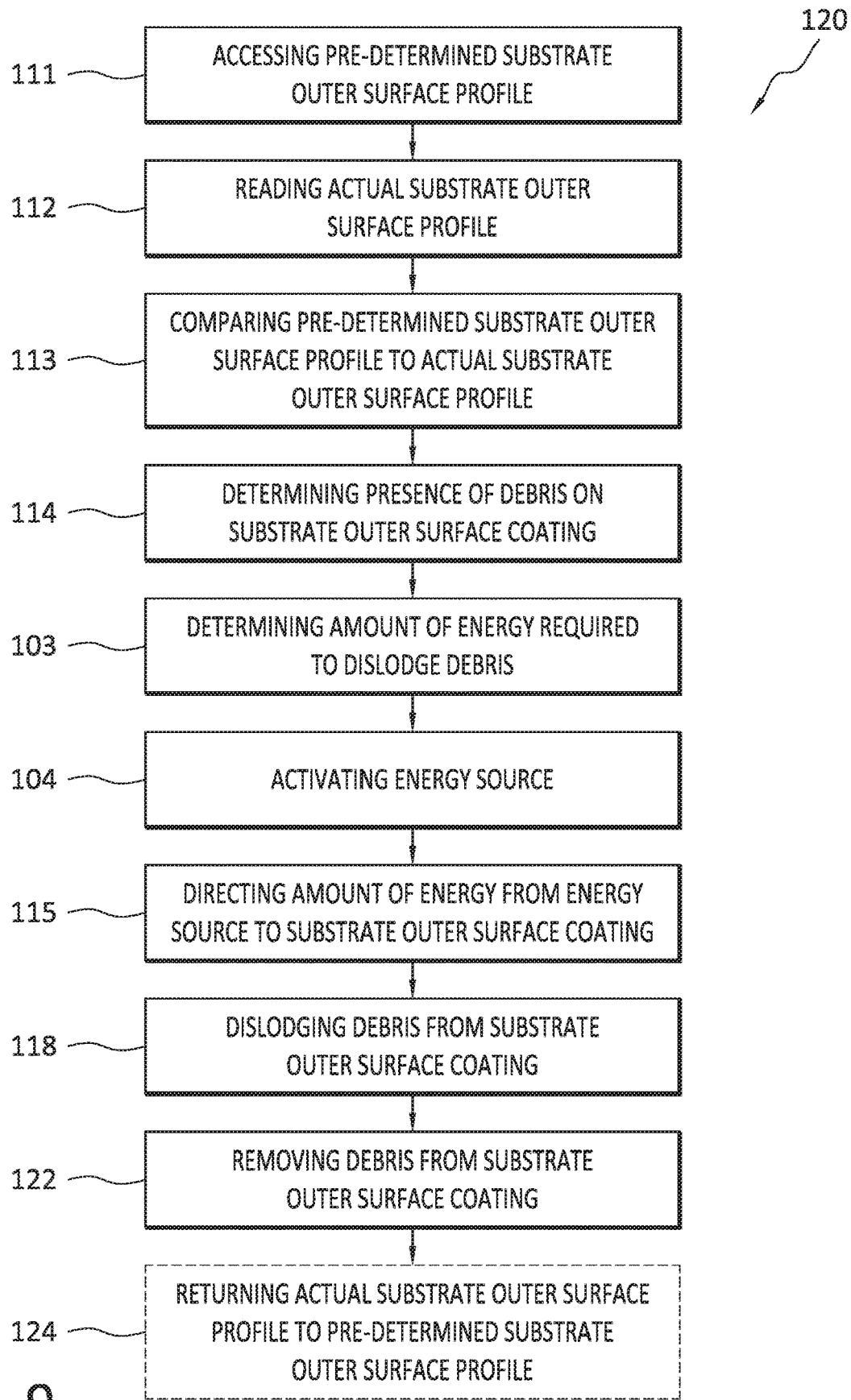

Having thus described variations of the disclosure in general terms, reference will now be made to the accompanying drawings, which are not necessarily drawn to scale, and wherein:

FIG. 1 is a box diagram illustrating an aspect of the present disclosure;

FIG. 2 is an illustration of an aspect of the present disclosure;

FIG. 3 is an illustration of an aspect of the present disclosure;

FIG. 4 is an illustration of an aspect of the present disclosure;

FIGS. 5A, 5B, and 5C are cross-sectional illustrations of a substrate outer surface being progressively treated according to aspects of the present disclosure;

FIG. 5D is an illustration of an enlarged cross-sectional view of the substrate outer surface shown in FIGS. 5A, 5B, and 5C;

FIGS. 6A, 6B, and 6C are illustrations of a substrate outer surface being progressively treated according to aspects of the present disclosure;

FIGS. 6D, 6E, and 6F are enlarged illustrations of the substrates shown in FIGS. 6A, 6B, and 6C;

FIG. 6G is an illustration of an enlarged cross-sectional view of the substrates outer surface shown at least in FIG. 6F;

FIG. 7 is a block diagram outlining a method according to aspects of the present disclosure;

FIG. 8 is a block diagram outlining a method according to aspects of the present disclosure; and FIG. 9 is a block diagram outlining a method according to aspects of the present disclosure.

DETAILED DESCRIPTION

According to present aspects, systems, methods, and apparatuses are disclosed for accurately detecting the presence of an amount of debris at specific and predetermined locations on a substrate outer surface, determining the amount of energy required to remove the debris, and removing such detected debris from the substrate outer surface at the precise and specific locations, when the presence of debris is detected at such locations. According to the present disclosure, the substrate outer surface can be a surface that is important to laminar flow. Contemplated outer substrate surfaces have an original, manufactured substrate outer surface profile (referred to equivalently herein as a "predetermined substrate outer surface profile" or "predetermined profile") that is specific to a particular location on a particular part or particular component. Disclosed methods, systems, and apparatuses assess the condition of an actual substrate outer surface profile at specific locations along a part or component outer surface. A predetermined substrate outer surface profile for the corresponding area of the part or component outer surface is accessed from a library (equivalently referred to herein as "memory" or "storage"), and the accessed predetermined substrate outer surface profile is then compared to the actual substrate outer surface profile. When the present systems and apparatuses detect a difference between actual and ideal substrate outer surface profiles, such a detected difference indicates that the actual substrate outer surface contains an amount of debris at a precise location on the substrate outer surface. According to present aspects, present methods, systems, and apparatuses detect the presence of debris, the amount of detected debris, and the specific location of detected debris to be removed from a specific area of a substrate outer surface. According to further aspects, present methods, systems, and apparatuses further determine the amount of energy required to be applied to a substrate outer surface to dislodge debris from the actual substrate outer surface. The present systems and apparatuses include an energy source that is activated. Integrated controllers control and/or direct a predetermined amount of energy (e.g., an amount of energy that present systems and apparatuses determine as being required for removing or dislodging the detected debris) from the energy source to the detected debris-containing area of the substrate outer surface. As the predetermined energy from the energy source is absorbed by the debris, the debris becomes dislodged from the substrate outer surface.

According to present aspects, the substrate outer surface can include one or more outer surface coating layers that, for example, can include a topcoat. In such instances, according to present aspects, a coating layer or layers present on the substrate, along with the substrate, together form the basis of the substrate outer surface profile. The present methods, systems, and apparatuses selectively dislodge debris that is present on the outermost substrate surface to return the actual substrate outer surface profile to a predetermined substrate outer surface profile. That is, when a topcoat or other coating is present on the outer substrate surface, the methods, systems and apparatuses described herein, in the process of accessing a known and predetermined substrate outer surface profile from a memory, the present systems, methods, and apparatuses recognize and account for the presence of the coating layer(s), such that only the debris is dislodged and removed from the substrate outer surface (e.g., no amount of coating layer is disturbed or removed).

In situations where HLFC surfaces and HLFC features are present on the substrate outer surface, (e.g., HLFC features including depressions, recesses, holes, etc.), according to present aspects, the terms "substrate outer surface" and "substrate outer surface profile" include such HLFC features, including scenarios where the HLFC features extend a distance or depth into the substrate outer surface. In such situations where debris removal from HLFC features present on substrate outer surfaces is desired, the predetermined substrate outer surface profile for the corresponding area of the part or component outer surface includes the HLFC features in the stored profile in the memory that is accessed according to present systems, methods, and apparatuses. The accessed predetermined substrate outer surface profile is then compared to the actual substrate outer surface profile. It is presently recognized that debris removal from HLFC features (e.g., HLFC "holes") can require a different amount and intensity of energy applied to the HLFC features to dislodge debris from such HLFC features. According to present aspects, the present systems detect debris at the location of the HLFC features, and an amount of energy required to dislodge debris from the HLFC features is directed to the HLFC feature to dislodge the detected debris to return the actual substrate outer surface profile to closely match the predetermined substrate outer surface profile, and without adversely impacting the substrate outer surface than can include a topcoat or other coatings.

According to present systems, apparatuses, and methods the term "return the actual substrate outer surface profile to a predetermined substrate outer surface profile" means that the predetermined substrate outer surface profile and the actual substrate outer surface profile are identical, substantially identical, or close enough within measured tolerances such that laminar flow over the actual substrate outer surface in the actual state (actual laminar flow) very closely approximates the laminar flow over the predetermined substrate outer surface (predetermined laminar flow). More specifically, while being bound to no particular theory, according to present aspects, "complete" or "substantially complete" debris removal from a substrate occurs when recognized ideal substrate surface tolerances are re-established. Such surface tolerances can include an actual substrate surface profile being returned to a predetermined substrate surface profile within about +/−0.030 in. In the case of re-establishing an ideal laminar flow to a treated substrate surface, according to present aspects, the present debris removal systems, methods, and apparatuses are said to "completely" or "substantially completely" remove debris from HLFC features when detected debris has been removed from at least about 85% of the HLFC features (e.g., HLFC openings, recesses, depressions, holes, etc.).

The present apparatuses, systems, and methods detect anomalies on a part surface by making use of known and stored parameters and schematics of an object's outer surface characteristics, including an object's substrate outer surface profile, by retrieving stored information about a specific surface location on a specific part or component and relaying such information to a sensor, controller and/or other system components for the purpose of comparing such stored surface characteristic information to an actual, assessed substrate outer surface profile of the same location on the same part type or same component type, preferably in real time. Detected disparities (e.g., deviations, etc.) between predetermined and actual outer surface characteristics equate to the presence of debris attached, affixed to, contained within HLFC features (e.g., HLFC openings, recesses, depressions, holes, etc.) or otherwise present and occurring on an actual part outer surface. Such a part outer surface that includes detected debris is then identified in real time by the present apparatuses, systems, and methods as requiring treatment and debris removal to restore a part surface's optimal outer surface profile (e.g., such that the treated area of the part—the substrate outer surface of the part—will again closely match the predetermined substrate outer surface profile of that particular part being evaluated at each specific location being evaluated on the substrate outer surface, etc.).

Present aspects contemplate precise positioning of disclosed detection systems and apparatuses at specific locations relative to an actual specific location on a specific substrate type, (e.g., specific location on a specific part or component) and the ability to obtain real-time image processing on demand and feedback of characteristics of an actual specific substrate outer surface at a precise location on the actual substrate outer surfaces. Processors and memory in communication with one another, according to the present systems and apparatuses, substantially concurrently (e.g., in real time) access and relay information (e.g. values) on the surface characteristics of a predetermined, or "stock", specific substrate type corresponding to the same location on the predetermined substrate. Such information on the characteristics and values correspond to a part and part surface that is unused, "new", and therefore in a "clean" state that will be "debris-free". The present systems and apparatuses compare the surface characteristic values for the same location on both the actual substrate outer surface and the predetermined substrate outer surface. If the values differ, then debris is determined to be present on the actual substrate outer surface. The precise positioning, comparison of ideal or predetermined values with actual values in real time, and debris detection is followed by the automated selection of intensity, wavelength and dwell time of energy that is then emitted from an integrated energy source and directed to the debris residing on the substrate outer surface. That is, according to present aspects, the present systems, methods, and apparatuses further determine, in real time, the amount of energy required to be directed from an energy source and directed to a substrate surface (e.g., including HLFC features located on an evaluated substrate outer surface) for the purpose of removing detected debris from a substrate outer surface.

FIG. 1 shows a non-limiting representation of a system according to an aspect of the present disclosure. As shown in FIG. 1, a system 10 for removing debris from a substrate outer surface includes a debris removal device 12 in communication with a positioning mechanism 11. The positioning mechanism 11 can be an automated and/or robotic mechanism that is responsive to signals from a positioning program that can be programmed to move the debris removal device 12, as well as the system 10 relative to a substrate having a substrate outer surface. The system 10 can include a housing or other structure (not shown) for containing and positioning the debris removal device 12. The debris removal device 12 includes an energy source 14 capable of emitting a predetermined amount of energy. The energy source 14 can be a laser or other energy source than emit beams of energy that can be directed from the energy source to a target such as, for example, a substrate outer surface. Present aspects contemplate various lasers and laser assemblies able to generate, emit and direct energy beams to a substrate outer surface at an intensity ranging from about 9 W to about 2 kW (2000 W). Energy beams in this range are selected and directed to amounts of debris on a substrate outer surface for the purpose of sublimating, ablating, and/or otherwise removing a predetermined amount of debris present from such substrate outer surface. According to further aspects, if a selected energy does not completely dislodge an amount of detected debris, the energy can be increased, or the debris removal device can be directed over the debris repeatedly as needed to accomplish the debris removal.

According to further aspects, the amount of energy provided (e.g., the intensity of the emitted energy beams in concert with the duration of the such emitted beams and emitted energy, or "dwell time" etc.) is selected to dislodge and/or remove a discovered amount of debris occurring on a substrate outer surface, without adversely impacting the substrate outer surface, including any substrate outer surface coatings that may exist on the substrate outer surface. The debris removal device 12 further includes at least one controller 16 that is in communication with the energy source 14 and the positioning mechanism 11. The controller 16 can control the activation of the energy source 14, and controller 16 can also control the movement and intensity of the of the beams emitted from the energy source 14. The controller 16 can be manually operated or can be remotely signaled to operate via operation of a unit (not shown) with the unit able to send signals from the unit to the controller 16 via, for example, wireless communication links, etc. Debris removal device 12 further includes at least one detector 18 capable of detecting an amount of and location of debris occurring on a substrate outer surface. Detector 18 can be in communication with a computer (not shown), or can itself contain a microprocessor (e.g., a microprocessor with pertinent predetermined substrate outer surface characteristics in a, or in communication with a memory. etc.) and assess the presence of debris, and can assess a substrate outer surface actual profile via camera or other photographic means, x-ray means, etc., and can create a digital or digitized image that can be a 3D image of the substrate outer surface actual profile. Detector 18 is further able to record, construct, or send an assessed substrate surface outer surface actual profile having substrate surface outer surface actual profile values to a memory 20 or other information storage device for the purpose of comparing the assessed substrate outer surface actual profile and actual substrate outer surface profile values with a substrate outer surface predetermined or "stock" profile that is accessible from the memory 20 (e.g., a library, electronic catalog, electronic storage, etc.); with the memory 20 providing known and specified predetermined substrate outer surface profiles of known and predetermined locations on such substrate outer surfaces, and with such predetermined substrate outer surface profiles having predetermined substrate outer surface profile values. In further aspects, system 10 further includes a processor 21 that, alone or with memory 20 also can be located remotely from system 10. Memory 20 may itself include a processor or, as shown in FIG. 1, processor 21 and memory 20 can be in communication and integrated into system 10. Together, detector 18, processor 21, memory 20, and controller 16 can be in communication for the purpose of sending and/or receiving signals and information regarding actual substrate surface profiles, retrieved or accessed predetermined substrate surface profile, disparities between the actual and predetermined substrate surface profiles, etc., as well as determining a total amount of energy required to dislodge debris including amount of energy (e.g., "total energy" including the amount and intensity of energy to be released from energy source 14 and directed to a substrate surface in combination with dwell time of the debris removal device 12 and beams of energy from energy source 14 directed to a particular substrate outer surface) required to dislodge debris from a location on a substrate outer surface.

According to further aspects, when the detector 18 perceives and otherwise assesses a substrate outer surface actual profile and processor 21 and memory 20 determine (e.g., detect, sense, etc.) a disparity between the actual substrate surface outer profile and the substrate surface outer predetermined profile, the controller 16 is signaled for the purpose of activating and controlling energy source 14, substantially in real time, and on demand. System 10, as shown in FIG. 1 further optionally includes an integrated vacuum 22 although, according to alternative aspects, vacuum 22 can be located remotely from and operated independently of system 10. The term "vacuum" and the act of "vacuuming" include any device and the positioning of such device capable of establishing a pressure gradient at the substrate outer surface for the purpose of removing debris and debris particulate from the substrate outer surface.

FIGS. 2, 3, and 4 show the present apparatuses, methods and systems employed to dislodge and remove debris from an object for the purpose of detecting debris on an substrate outer surface actual profile, and then dislodging and removing such debris to return the substrate outer surface to more closely approach or indeed match a substrate outer surface profile predetermined profile. As shown, in non-limiting fashion, in FIG. 2 an object is an aircraft 30 having a fuselage section 31. A plurality of debris removal devices 32 are shown, with each debris removal device 32 attached or otherwise in communication with a mechanical arm 34 with both the mechanical arm 34 and the debris removal device in communication with a power cord 35. As shown in FIG. 2, mechanical arm 34 includes sections than can extend or retract, etc. The mechanical arm 34 can be any mechanical device that can be moveable is response to actuating the mechanical device. According to present aspects, the methods, systems, and apparatuses can be automated such that the control and movement of the mechanical arm 34 can be automated such that, for example, the mechanical arm 34 includes, without limitation, robotic "arms", robotic "hands", etc. Further, the debris removal device itself and the energy course itself can be automatically controlled via incorporated robotics and robotic devices.

As further shown in FIG. 2, an operator cab 33 is dimensioned to house an operator, and is further in communication with and is operable to direct movement and location of the debris removal device 32 relative to a substrate outer surface 36 present on aircraft 30. FIG. 2 also shows a vacuum hose 37 located proximate to the debris removal device 32 and proximate to the substrate outer surface 36 when the debris removal device 32 is directed to a position proximate to the substrate outer surface 36. As shown in FIG. 2, the debris removal devices 32 are shown attached to fixed position mechanical devices that can be manually operated or automatically operated and even remotely operated for the purpose of positioning the debris removal device 32 to positions proximate to various areas along the fuselage 31. The systems and apparatuses shown in FIG. 2 can implement the systems and apparatuses shown in FIG. 1.

According to present aspects, though not shown in FIG. 2, the debris removal device may be positioned relative to or proximate to a substrate surface outer surface by any mechanical positioning device able to precisely position and precisely locate the debris removal device at a specific location for the purpose of scanning the substrate outer surface to detect the presence or absence of debris on the substrate outer surface. According to further aspects, positioning mechanisms used to move and precisely position the overall apparatus as well as the devices used to maneuver and position the debris removal device with precision relative to the substrate outer surface can include, without limitation, robotics and other automated devices that can be controlled on-site or that can be controlled remotely with, for example, wireless technology and other technologies, including the use of hardware and software required to operate the positioning mechanisms.

Such mechanical positioning devices can further include, for example, drones or other objects, etc. that can be directed to specified locations with a required amount of precision and that can be operated remotely and/or automatically, and that that can be operated and directed using robotics; e.g., an entirely automated system. Such objects can incorporate, for example, one or more global positioning systems (GPS) working in concert with locators that can be, for example, incorporated into regions of the objects that are targeted for debris removal.

As stated herein, to return an actual substrate outer surface profile to a desired predetermined substrate outer surface profile, a substrate outer surface is first scanned to assess and confirm whether or not the scanned substrate outer surface profile matches or adequately approximates a known stored substrate outer surface predetermine profile. The debris removal systems of the present disclosure incorporate the scanning, sensing, etc. functions that compare actual and predetermined outer substrate surface profiles. If a disparity between actual and predetermined profiles is detected, such disparity confirms the presence of unwanted debris on the substrate outer surface. If debris is detected on the substrate outer surface, an energy source integrated into or located proximate to and in communication with the debris removal device is engaged or activated, and a predetermined amount of energy is directed from the energy source to the substrate outer surface in a predetermined amount that is adequate to dislodge detected debris from the substrate outer surface.

According to a present aspect, an integrated vacuum assembly can include the components required to generate a negative pressure including, for example, motors, hoses, pumps housings, assemblies, etc. that normally attend a vacuum assembly. The vacuum assembly (not shown) is activated during the debris dislodging/removal process to provide an area of negative pressure adjacent to the substrate outer surface where the debris is detected. As debris is dislodged/removed from the substrate outer surface, debris will leave the substrate outer surface in particulate debris form, ablated debris form, etc. (collectively equivalently referred to herein as "particulate debris" or "particulate"). The particulate debris is then drawn into an airstream (moving in a direction into an open end of the vacuum hose), with the vacuum created by the negative pressure of the vacuum. The particulate debris is directed into the vacuum hose 37 and away from both the substrate outer surface and the surrounding environment (e.g., including the region and environment immediately adjacent to the substrate outer surface, etc.). According to present aspects, the incorporation of the vacuum into the present systems, apparatuses, and methods insures that unwanted debris that is dislodged from the substrate outer surface (e.g., by the application of a predetermined amount of energy from an energy source, etc.) will not re-settle or otherwise become re-deposited on the substrate outer surface.

The present systems, apparatuses, and methods efficiently and selectively remove predetermined amounts of debris from specific regions of substrate outer surfaces of outer surfaces of large objects and vehicles (e.g. aircraft, spacecraft, rotorcraft, etc.). According to present aspects, the ability to avoid the re-deposition of debris onto substrate outer surfaces including, for example, laminar surfaces of aircraft is especially desirable. In addition, by applying a vacuum in the region of the debris removal, present aspects avoid the re-deposition of dislodged debris, as well as particulate debris into substrate outer surface recesses (e.g., holes for pitot tubes, seams, depressions, HLFC features, etc.). Presently disclosed methods and systems therefore help to avoid issues that can otherwise occur with dislodged debris from cleaned surfaces that re-deposits into or onto important instrumentation at could affect, for example, correct airspeed readings of aircraft in flight (e.g. from blocked or clogged pitot tubes, blocked or clogged static vents, etc.).

Additionally, according to present aspects, in the case of HLFC features impacting the establishment or improvement of laminar flow over a surface, eliminating the presence of dislodged particulate debris from the region(s) proximate to the area of the substrate outer surface (from which debris has been dislodged and removed), eliminates or ameliorates the risk of particulate debris re-settling or otherwise becoming deposited onto and into surface structures that could foul or re-clog HLFC features (e.g., HLFC holes) and interfere with performance of the components and parts that, for example, include the HLFC features in an substrate outer surface.

FIGS. 3 and 4 show another portion of aircraft 30 showing a wing 38 attached to a fuselage section 31. As shown in FIG. 3, in non-limiting fashion, debris removal device 32 is now attached to a unit 39 in communication with mechanical arm 34. Power cord 35 is shown in communication with debris removal device 32 and unit 39 and a vacuum assembly, including the vacuum hose 37, is integrated into unit 39. According to further aspect, a vacuum assembly including vacuum hose 37 can be provided to, and be considered a part of, a debris removal system even if a vacuum system is provided to the overall debris removal system separately from unit 39. In FIG. 3, debris removal device 32 is shown positioned proximate to a section or area of the lower wing outer surface 38a.

FIG. 4 shows mechanical arm 34 now extended from unit 39 to a position to facilitate locating and positioning the debris removal device 32 proximate to a section or area of the upper wing outer surface 38b. The systems and apparatuses shown in FIGS. 1 and 2 can implement the systems and apparatuses shown in FIGS. 3 and 4.

FIGS. 5A, 5B, and 5C show non-limiting cross sectional views of upper wing outer surface 38b of wing 38 (shown in FIGS. 3 and 4). FIGS. 5A, 5B, and 5C show upper wing outer surface comprising a wing substrate 40a onto which is deposited a wing coating layer 40b. FIG. 5D shows an enlarged cross-sectional view of upper wing outer surface region 40 (shown in FIG. 5A) of upper wing outer surface 38b. According to present aspects, as shown in detail in FIG. 5D, the wing coating layer 40b together with the wing substrate 40a form the upper wing outer surface 38b.

FIG. 5A shows an amount of debris 44 present near a leading edge of upper wing outer surface 38b. According to present aspects, present systems, methods, and apparatuses are employed to scan (not shown) the upper wing outer surface and determine the presence of debris 44, with debris 44 potentially not being visible to the human eye. However, the non-visible amount of debris present and detected by present systems and methods on the upper wing outer surface can impact laminar flow disadvantageously (e.g., in terms of increasing "drag" and increasing fuel consumption of the aircraft in flight, etc.). An energy source (not shown) within or in communication with debris removal device 32 has been activated, and a predetermined amount of energy at a predetermined intensity is emitted from debris removal device 32 and directed to upper wing outer surface 38b onto which an amount of debris 44 is attached. The emitted energy is shown as energy beam 42 in a series of broken lines extending from the debris removal device 32 and the upper wing outer surface 38b. Vacuum hose 37 is shown located proximate to the debris removal device 32 and the upper wing outer surface 38b and the amount of debris 44 attached to the upper wing outer surface 38b.

As shown in FIG. 5B, enough energy has been directed to the debris 44 attached to the upper wing outer surface 38b to form debris particulate 44a. As debris particulate becomes dislodged from upper wing outer surface 38b, the formed debris particulate 44a leaves the upper wing outer surface 38b or is loosened to a degree considered to have "dislodged" or detached from the upper wing outer surface 38b, without disturbing the integrity or ideal profile of the upper wing outer surface. As shown in FIG. 5B, as the debris particulate becomes dislodged (or, if desired, before debris particulate becomes dislodged), present systems activate a vacuum to create a pressure gradient in the vicinity of the debris particulate 44a that is dislodged from the upper wing outer surface such that the debris particulate is directed toward and into vacuum hose 37. The process continues until, as shown in FIG. 5C, none of the debris 44 or debris particulate 44a remains in the vicinity of the upper wing outer surface 38b. At the completion of the debris removal process, with the completed removal of debris, the upper wing outer surface actual profile has been returned to very closely or completely match the upper wing outer surface predetermined profile. According to present aspects, a post-processing scan of the treated upper wing outer surface can be conducted to ensure the removal of the debris without any unwanted impact on, or degradation of the upper wing outer surface (e.g., the substrate outer surface).

Although not visible in FIGS. 5A, 5B, and 5C, the upper wing outer surface 38b includes a plurality of HLFC holes (shown as HLFC holes 50 in enlarged views FIGS. 6D, 6E, 6F, 6G) extending from the upper wing outer surface 38b, and extending through the substrate (e.g., the upper wing outer surface 38b), with the holes bounded by the substrate such that the substrate forms the wall of the HLFC holes. The systems and apparatuses shown in FIGS. 5A, 5B, 5C, and 5D can implement the systems and apparatuses shown in FIGS. 1, 2, 3, and 4.

FIGS. 6A, 6B, and 6C show non-limiting overhead plan views of upper wing outer surface 38b, and further illustrate the progressive processes conducted and shown in FIGS. 5A, 5B, and 5C, respectively. As shown in FIGS. 6A, 6B, and 6C, according to present aspects, the debris removal device 32 can be moved to multiple positions and locations (e.g., in the direction as indicated by arrow "A" in FIG. 6A) during and throughout the process of emitting energy in response to signals sent to the debris removal device from, for example, a controller. That is, as debris is detected at a specific location on a substrate outer surface, the energy source is activated to release and direct a predetermined amount of energy required to dislodge the detected debris. During this energy release, the debris removal device itself can be moved or can remain stationary during energy release and beams of emitted energy can be directed to move to desired specific locations, so long as an adequate amount of energy (calculated by the system to dislodge the debris) is administered to the debris to be dislodged and removed.

FIGS. 6D, 6E, and 6F are enlarged views of the upper wing outer surface 38b shown in FIGS. 6A, 6B, and 6C. As shown in FIG. 6D, the upper wing outer surface 38b includes a plurality of HLFC holes 50, extending a desired distance from the upper wing outer surface 38b, into the wing 38 and, if desired, extending through the substrate material of the wing 38. The HLFC holes 50 (also referred to equivalently herein as "micro holes" or HLFC micro holes") can extend through a substrate material (e.g., a wing substrate material), with the holes 50 bounded by the wing substrate material.

FIG. 6G is an enlarged cross-sectional view of upper wing outer surface 38b FIG. 6G shows an enlarged cross-sectional view of upper wing outer surface 38b as shown in FIG. 6F and taken across line 6G-6G. According to present aspects, as shown in detail in FIG. 6G, the wing coating layer 40b together with the wing substrate 40a form the upper wing outer surface 38b.

As shown in FIG. 6G, the HLFC holes 50 include a first opening 50a at the upper wing outer surface 38b and a second opening 50b at the inner surface of sing substrate 40a, with the hole "tunneling" through the substrate from first opening 50a to second opening 50b, (e.g., extending from the first opening to the second opening, and with the substrate serving as the walls bounding the "tunneling" holes, etc.). The HLFC holes can have a diameter ranging from about 50 μm to about 100 μm. As shown in FIG. 6D, HLFC holes 50 can accumulate or otherwise contain and/or collect an amount of debris 44, with the debris 44 shown as "clogging" the openings of holes 50 at the upper wing outer surface 38b.

As shown in FIGS. 6D, 6E, and 6F, the substrate outer surface is illustrated as a representative upper wing outer surface 38b. The detection of debris is accomplished by a detector comparing feedback from the specific location on the actual upper wing surface profile to the predetermined substrate outer surface profile values of the same wing component "type" that are accessed from a memory housing such catalogued predetermined substrate outer surface profiles. Once the presence of debris is confirmed as existing at or in the HLFC holes. An energy source (not shown) within or in communication with debris removal device 32 (e.g., as shown in FIGS. 6A and 6B) is activated, and a predetermined amount of energy at a predetermined intensity is emitted from debris removal device 32 and directed to upper wing outer surface 38b onto which an amount of debris 44 is attached at the location of the upper wing outer surface 38b where the HLFC holes 50 are located. As described above and shown in in FIGS. 6A and 6B, the emitted energy is shown as energy beam 42 in a series of broken lines extending from the debris removal device 32 to the upper wing outer surface 38b. Vacuum hose 37 is shown located proximate to the debris removal device 32 and the upper wing outer surface 38b and the amount of attached debris 44.

As shown in FIG. 6E, enough energy has been directed to the debris 44 located at HLFC holes 50 on upper wing outer surface 38b to form debris particulate 44a that has been dislodged from the HLFC holes 50. As debris particulate 44a becomes dislodged from HLFC holes 50 in upper wing outer surface 38b, the debris particulate 44a leaves the HLFC holes 50 in upper wing outer surface 38b, or is loosened to a degree considered to be "dislodged" or detached from the upper wing outer surface 38b, without disturbing the integrity or ideal profile of the upper wing outer surface 38b. As shown in FIG. 6E, as the debris particulate becomes dislodged (or, if desired, before debris particulate becomes dislodged), present systems activate a vacuum to create a pressure gradient in the vicinity of the dislodged debris particulate 44a. As shown in FIG. 6F, the debris particulate 44a leaves the surface of upper wing outer surface 38b and the debris particulate 44a is no longer present, having been removed from the HLFC holes 50 of upper wing outer surface 38b and directed toward and into vacuum hose 37. FIGS. 6A-6F can implement the systems, methods, and apparatuses shown in FIGS. 1, 2, 3, 4, 5A, 5B, 5C, and 5D.

According to further aspects, the substrate outer surface can be monitored in real-time during energy release, and the emission of energy from the debris removal device can be terminated once the debris is dislodged. The debris removal device 32 can be maintained at a substantially fixed position, or can be moved to a desired distance from the substrate outer surface while it is moved to a new location relative to the substrate outer surface (e.g., in a scan-like fashion in response to signals from a processor to a controller in communication with the debris removal device, etc.). The control of the movement of the debris removal device and the control of the "dwell time" over a specific substrate outer surface location (in concert with the amount of energy released from the debris removal device) can be calculated to deliver the amount of energy required to dislodge unwanted debris from a specific substrate outer surface location without any unwanted impact on, or degradation of the a substrate outer surface. That is, according to present aspects, the system can be activated and an energy release initiated only when debris is detected. In other words, according to present aspects, the present systems will not activate in the absence of detected debris. Further, the release of energy can be terminated once debris removal occurs. When no further debris is detected on an inspected area of a substrate outer surface, no further energy is released from the system or applied to the outer substrate surface(s).

FIG. 7 is a flow diagram illustrating a non-limiting method according to present aspects. As shown in FIG. 7, an illustrative method 100 is outlined including determining 102 the presence of debris on a substrate outer surface followed by determining 103 the amount of energy required to dislodge the detected debris and activating 104 an energy source. The method 100 further includes directing 105 an amount of energy from an energy source to a substrate outer surface followed by dislodging 106 the detected debris from the substrate outer surface. The outlined method 100 further includes the optional vacuuming 107 dislodged debris from the substrate outer surface.

FIG. 8 is a flow diagram illustrating a non-limiting method according to present aspects. As shown in FIG. 8, according to present aspects, a representative method 110 further describes the process of determining the presence of debris on a substrate outer surface. Method 110 includes accessing 111 a predetermined substrate outer surface profile (e.g., from a memory, storage, library etc. containing or facilitating access to such predetermined substrate outer surface profile corresponding to a particular part outer surface profile or particular component outer surface profile), reading 112 an actual substrate outer surface profile of the particular part or component outer surface. The method 111 further includes comparing 113 the predetermined substrate outer surface profile (e.g., predetermined profile values, etc.) to the actual substrate outer surface profile (e.g., actual profile values, etc.).

FIG. 9 is a flow diagram illustrating a non-limiting method according to present aspects. As shown in FIG. 9, illustrative method 120 includes accessing 111 a predetermined substrate outer surface profile (e.g., from a memory, storage, library etc. containing or facilitating access to such predetermined substrate outer surface profiles corresponding to a particular part outer surface or component outer surface), reading 112 an actual substrate outer surface profile of the particular part or component outer surface. The method 111 further includes comparing 113 the predetermined substrate outer surface profile (e.g., ideal profile value(s), etc.) to the actual substrate outer surface profile (e.g., actual profile values, etc.). Method 120 as outlined further includes determining 102 the presence of debris on a substrate outer surface coating 114 followed by determining 103 the amount of energy required to dislodge the detected debris and activating 104 an energy source. The method 100 further includes directing 115 an amount of energy from an energy source to a substrate outer surface coating, followed by dislodging 118 detected debris from the substrate outer surface coating, removing 122 debris from the substrate outer surface coating, and optionally returning the actual substrate outer surface profile to the predetermined substrate outer surface profile. The methods outlined in FIGS. 7, 8, and 9 can implement the systems and apparatuses shown in FIGS. 1, 2, 3, 4, 5A, 5B, 5C, 5D, 6A, 6B, and 6C.

Contemplated energy sources according to present systems, apparatuses, and methods include, for example, laser systems that can be adapted to generate a laser beam or beams with a power ranging from about 9 W to about 2 kW, and in particular with a power ranging from about 60 W to about 2 kW, and further in particular with a power ranging from about 9 W to about 95 W. Lasers that emit energy within the states ranges include, for example, gas lasers, solid-state lasers, semiconductor lasers, etc. The energy source can further comprise a wavelength adjuster that allows a wavelength to be adjusted or "tuned" to a desired wavelength in real time. By adjusting the wavelength in combination with real time monitoring of the substrate outer surface being treated, the debris can be dislodged from substrate outer surfaces, according to present systems and methods, without adversely impacting the substrate outer surface and any substrate outer surface coatings (e.g. paint layers, primer layers, topcoat layers, etc.).

Present systems, methods, and apparatuses can employ software that can include an algorithm to determine a maximum and/or minimum energy power to be selected for a predetermined substrate outer surface, and then applied to a corresponding actual substrate outer surface. According to present aspects, based upon the livery of the composition of the substrate outer surface, a particular region of the substrate outer surface to be treated may not be able to withstand a particular energy intensity of applied energy as another region, or more energy may be required to cause the desired degree of removal (e.g., the complete removal, etc.) of debris from the actual substrate outer surface. Likewise, as explained herein, more energy may be required and delivered to remove debris from, and contained within, the areas of the Hybrid Laminar Flow Control (HLFC) recesses (including, e.g., HLFC holes, etc.).

According to further aspects, positioning mechanisms used to move the entire apparatus as well as the devices used to maneuver and position the debris removal device relative to the substrate outer surface can include, without limitation, robotics and other automated devices that can be controlled on-site or that can be controlled remotely with, for example, wireless technology and other technologies, including the use of hardware and software required to operate the positioning mechanisms.

According to further aspects, such larger structures and objects that can include the actual substrate outer surfaces to be treated by the present methods, systems, and apparatuses can further include, for example and without limitation, manned and unmanned spacecraft, manned and unmanned aircraft, manned and unmanned hovercraft, manned and unmanned rotorcraft, manned and unmanned terrestrial vehicles, manned and unmanned surface watercraft, manned and unmanned sub-surface watercraft, manned and unmanned satellites, etc., and combinations thereof.

The flowcharts and block diagrams in the different depicted aspects illustrate the architecture, functionality, and operation of some possible implementations of apparatuses, systems, and methods in an illustrative aspect. In this regard, each block in the flowcharts or block diagrams may represent a module, segment function, and/or a portion of an operation or step. For example, one or more of the blocks can be implemented as program code, in hardware, or a combination of the program code and hardware. When implemented in hardware, the hardware can, for example, take the form of integrated circuits that are manufactured or configured to perform one or more operations in the flowcharts or block diagrams.

In some alternative implementations of an illustrative aspect, the function or functions noted in the block of the flowcharts or block diagrams may occur out of the order noted in the FIGs. For example, in some cases, two blocks shown in succession can be executed substantially concurrently depending upon the functionality involved. Further blocks can be added to the illustrated blocks in a flowchart or block diagram.

Aspects of the present invention may, of course, be carried out in other ways than those specifically set forth herein without departing from essential characteristics of the invention. The present aspects are to be considered in all respects as illustrative and not restrictive, and all changes coming within the meaning and equivalency range of the appended claims are intended to be embraced therein.

What is claimed is:

1. A system comprising:
   a detector configured to determine the presence of detected debris on an actual substrate outer surface at a specified location on the actual substrate outer surface, said actual substrate outer surface comprising an ideal substrate outer surface profile, said ideal substrate outer surface profile comprising an ideal substrate outer surface profile thickness;
   a memory comprising characteristics of the ideal substrate outer surface profile, said memory in communication with the detector;
   a processor configured to access the ideal substrate outer surface profile from the memory, said processor in communication with the detector, said processor in further communication with the memory;
   at least one controller, said at least one controller in communication with the processor, and said at least one controller in communication with the memory;
   a positioning mechanism in communication with the controller;
   an energy source in communication with the at least one controller;
   a vacuum in communication with the at least one controller; and
   wherein the processor in combination with the detector and the memory is configured to determine a difference between the actual substrate outer surface profile and the ideal substrate outer surface profile, said ideal substrate outer surface profile accessed from the memory, said actual substrate outer surface profile detected by the detector, said processor configured to compare the ideal substrate surface outer profile to the actual substrate outer surface profile; and
   wherein the energy source is configured to release a predetermined amount of energy from the energy source, said predetermined amount of energy sufficient to only remove the detected debris from the actual substrate outer surface.

2. The system of claim 1, wherein the actual substrate outer surface profile further comprises an actual substrate outer surface coating;
   wherein the system is configured to effect a predetermined energy release from the energy source to remove debris from the actual substrate outer surface coating to return the actual substrate outer surface profile to closely approximate the ideal substrate outer surface profile.

3. The system of claim 1, wherein the energy source comprises a laser.

4. The system of claim 1, wherein the controller is configured to control the predetermined energy released from the energy source for a predetermined duration; and
   wherein the at least one controller is further configured to control movement of the positioning mechanism.

5. The system of claim 1, wherein the detector comprises at least one camera.

6. The system of claim 2, wherein the system is configured to direct the predetermined energy release to a predetermined location on the actual substrate outer surface for a predetermined amount of time.

7. The system of claim 1, wherein the actual substrate outer surface comprises a hybrid laminar flow control surface, said hybrid laminar flow control surface comprising a plurality of micro holes.

8. The system of claim 4, wherein the predetermined amount of energy released from the energy source for a predetermined duration ranges from 9 W to 2 kW.

9. A method comprising:
   accessing, by a processor, an ideal substrate outer surface profile from a memory;
   reading, by a detector, an actual substrate outer surface profile of an actual substrate outer surface at a specific actual substrate outer surface location; and
   comparing, by the processor, the ideal substrate outer surface profile of the specific substrate outer surface location to the actual substrate outer surface profile of the specific substrate outer surface location;
   determining, by the processor, a presence of debris on the actual substrate outer surface at a specific actual substrate outer surface location;
   determining, by a controller, an amount of energy required to dislodge the debris from the actual substrate outer surface at the specific actual substrate surface location;
   wherein the controller in communication with the processor, and the controller in communication with the memory activate, by the controller, an energy source;
   directing, by a positioning mechanism, the amount of energy from the energy source required to dislodge the debris at the specific actual substrate outer surface location;
   dislodging, by the energy source, the debris from the actual substrate outer surface at the specific actual substrate outer surface location to form an amount of dislodged debris; and
   after step of dislodging the amount of dislodged debris from the actual substrate outer surface, the method further comprising: vacuuming the dislodged debris from the actual substrate outer surface.

10. The method of claim 9, the actual substrate outer surface comprising an actual substrate outer surface coating, said method further comprising:
    dislodging the debris from the actual substrate outer surface coating, without dislodging the actual substrate outer surface coating.

11. The method of claim 9, further comprising:
    emitting an amount of energy from the energy source, said amount of energy ranging from about 9 W to about 2 kW, said amount of energy required to dislodge the debris at the specific actual substrate outer surface location.

12. A method comprising:
accessing, by a processor, an ideal substrate outer surface profile of a specific ideal substrate outer surface location from a stored ideal substrate outer surface profile;
reading, by a detector, an actual substrate outer surface profile of a specific actual substrate outer surface location;
comparing, by the processor, the ideal substrate outer surface profile of the specific ideal substrate outer surface location to the actual substrate outer surface profile of the specific actual substrate outer surface location;
determining, by the processor, a presence of debris on an actual substrate outer surface coating at the specific actual substrate outer surface location;
determining, by a controller, an amount of energy required to dislodge the debris from the actual substrate outer surface coating at the specific actual substrate outer surface location;
activating, by the controller, an energy source to emit the amount of energy required to dislodge the debris at the specific actual substrate outer surface location;
wherein the controller in communication with the processor, and the controller in communication with the memory; directing, by a positioning mechanism, the amount of energy required to dislodge the debris at the specific actual substrate outer surface location from the energy source to the debris at the specific actual substrate outer surface location; and
dislodging, by the energy source, the debris from the actual substrate outer surface coating at the specific actual substrate outer surface location without dislodging the actual substrate outer surface coating to form an amount of particulate debris; and
removing, by a vacuum, the amount of particulate debris from the actual substrate outer surface coating.

13. The method of claim 12, the step of comparing the ideal substrate outer surface profile to the actual substrate outer surface profile, further comprising:
determining a difference between the actual substrate outer surface profile and the ideal substrate outer surface profile.

14. The method of claim 12, wherein after the step of removing the amount of particulate debris from the actual substrate outer surface coating, further comprising:
returning the actual substrate outer surface profile to an actual substrate outer surface profile that is substantially equivalent to the ideal substrate outer surface profile.

15. The method of claim 12, the actual substrate outer surface coating comprising: an actual substrate outer surface coating thickness; and
wherein the actual substrate outer surface coating thickness is treated by the removal of accumulated debris to return the actual substrate outer surface thickness to the ideal substrate outer surface coating thickness after the step of removing the amount of particulate debris from the actual substrate outer surface coating.

16. The method of claim 12, wherein the actual substrate outer surface profile is configured to facilitate a laminar flow over the actual substrate outer surface.

17. The method of claim 12, the ideal substrate outer surface profile comprising;
at least one recess in the ideal substrate outer surface profile.

18. The method of claim 17, the ideal substrate outer surface comprising:
a hybrid laminar flow control surface, said hybrid laminar flow control surface comprising a plurality of micro holes.

* * * * *